(12) United States Patent
Huang (10) Patent No.: US 7,983,484 B2
(45) Date of Patent: Jul. 19, 2011

(54) PATTERN RECOGNITION SYSTEM, PATTERN RECOGNITION METHOD, AND PATTERN RECOGNITION PROGRAM

(75) Inventor: Lei Huang, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/831,711

(22) Filed: Jul. 7, 2010

(65) Prior Publication Data
US 2010/0272371 A1    Oct. 28, 2010

Related U.S. Application Data

(62) Division of application No. 10/586,300, filed as application No. PCT/JP2005/000272 on Jan. 13, 2005, now Pat. No. 7,778,463.

(30) Foreign Application Priority Data

Jan. 15, 2004    (JP) .................................. 2004-008533

(51) Int. Cl.
*G06K 9/46* (2006.01)
*G06K 9/72* (2006.01)
(52) U.S. Cl. ..................... 382/181; 382/190; 382/228
(58) Field of Classification Search .................. 382/115, 382/124, 125, 116, 181, 228, 226, 190, 100, 382/187, 209, 159, 156, 161, 280, 189, 165; 706/20, 25, 12, 21, 45; 396/121; 725/22, 725/19; 700/29
See application file for complete search history.

(56) References Cited

U.S. PATENT DOCUMENTS

| | | | | |
|---|---|---|---|---|
| 5,740,274 A | * | 4/1998 | Ono et al. .................... | 382/190 |
| 5,978,495 A | * | 11/1999 | Thomopoulos et al. ...... | 382/124 |
| 5,999,637 A | * | 12/1999 | Toyoda et al. ................ | 382/124 |
| 6,233,348 B1 | | 5/2001 | Fujii et al. | |
| 6,259,805 B1 | * | 7/2001 | Freedman et al. ............ | 382/124 |
| 6,463,165 B1 | * | 10/2002 | Ito ................................. | 382/124 |
| 6,498,861 B1 | * | 12/2002 | Hamid et al. ................. | 382/124 |
| 6,526,396 B1 | | 2/2003 | Hiratsuka et al. | |

(Continued)

FOREIGN PATENT DOCUMENTS

| | | |
|---|---|---|
| EP | 1 160 721 A2 | 5/2001 |
| JP | 10-124669 | 5/1998 |
| JP | 11-195119 | 7/1999 |
| JP | 2000-182057 A | 6/2000 |

(Continued)

*Primary Examiner* — Sheela C Chawan
(74) *Attorney, Agent, or Firm* — Foley & Lardner LLP (57) ABSTRACT

A pattern recognition system, pattern recognition method, and pattern recognition program capable of increasing the accuracy in computing the false acceptance probability and capable of ensuring a stable security strength are provided. Pattern recognition systems 10 and 10*a* comprise a first probability computation unit 32, and a second probability computation unit 33 coupled to the first probability computation unit 32. The first probability computation unit 32 computes a first probability $P_{FCR}$ based on the number n of corresponding characteristic points cs1 to csn and cf1 to cfn indicating points corresponding between characteristic points s1 to $sn_s$ in a first pattern and characteristic points f1 to $fn_f$ in a second pattern. The first probability $P_{FCR}$ indicates the probability of existence of a third pattern that has a greater number of corresponding characteristic points to the first pattern than the number n of the corresponding characteristic points. The second probability computation unit 33 refers to the first probability $P_{FCR}$ to compute a false acceptance probability $P_{FAR}$ indicating the probability of falsely determining that the first pattern and the second pattern correspond to each other.

34 Claims, 7 Drawing Sheets

U.S. PATENT DOCUMENTS

| | | |
|---|---|---|
| 6,816,605 B2 | 11/2004 | Rowe et al. |
| 6,895,104 B2 | 5/2005 | Wendt et al. |
| 7,003,164 B2 | 2/2006 | Takebe |
| 7,006,673 B2 | 2/2006 | Hamid |
| 7,043,083 B2 | 5/2006 | Monden |
| 7,515,739 B2 | 4/2009 | Porter et al. |
| 7,577,297 B2 * | 8/2009 | Mori et al. .................. 382/190 |
| 2002/0131644 A1 | 9/2002 | Takebe |

FOREIGN PATENT DOCUMENTS

| | | |
|---|---|---|
| JP | 2000-215313 A | 8/2000 |
| JP | 2000-242786 A | 9/2000 |
| JP | 2002-230551 A | 8/2002 |
| JP | 2002-288667 A | 10/2002 |
| JP | 3439359 | 6/2003 |
| WO | WO 96/12246 | 4/1996 |

* cited by examiner

PATTERN RECOGNITION SYSTEM, PATTERN RECOGNITION METHOD, AND PATTERN RECOGNITION PROGRAM

CROSS-REFERENCE TO RELATED PATENT APPLICATIONS

The present application is a division of U.S. application Ser. No. 10/586,300, filed Jul. 14, 2006, now pending, which is a National stage of PCT/JP2005/000272, filed on Jan. 13, 2005, which is based upon and claims the benefit of priority from Japanese Patent Application No. 2004-008533, filed Jan. 15, 2004, by Lei Huang, the entire contents of all of which are incorporated herein by reference. This application claims only subject matter disclosed in the parent application and therefore presents no new matter.

TECHNICAL FIELD

The present invention relates to a pattern recognition method, system, and program, and particularly to a pattern recognition method, system, and program for identifying a person based on data such as voice data or image data.

BACKGROUND ART

When a fingerprint verification apparatus is used to identify a person, the following process is generally performed. First, the degree of consistency (the match rate) between an input fingerprint pattern obtained by a sensor or the like and a registered fingerprint pattern that has been registered in advance is computed. Then, the match rate is compared with a predetermined threshold to determine whether the input fingerprint pattern and the registered fingerprint pattern are of the same person. Based on the determination result, the person is identified. In this personal identification process, the rate at which an input fingerprint pattern of a person is falsely determined to be identical with a registered fingerprint pattern of another person is called the "false acceptance rate."

In this type of fingerprint verification apparatus, the predetermined threshold is often uniformly fixed to a certain value irrespective of which finger is verified. However, the match rate between the fingerprint patterns actually varies among persons (fingers). That is, some people have fingerprints that provide a high match rate, while other people have fingerprints that only provide a low match rate. Therefore, if the threshold is set to a higher value, the fingerprint verification apparatus tends to reject authentication of a wrong person, but it also tends to falsely reject authentication of the genuine person. Conversely, if the threshold is set to a lower value, the fingerprint verification apparatus tends to accept authentication of the genuine person, but it also tends to falsely accept authentication of a wrong person. This will be a cause of reduction in the identification success rate.

According to a data recognition method disclosed in Patent Document 1 (Japanese Patent Application Laid-Open No. 2000-215313), the match rate between each registered data item and other registered data items is computed. Then, based on a match rate distribution obtained for each registered data item, a threshold for the registered data item is generated. When a person is identified, the match rate between a verification target data to be recognized and a corresponding candidate data item in the registered data items is computed. The computed match rate is compared with the threshold for the candidate data item to determine whether the verification target data and the candidate data correspond to each other. In this data recognition method of Patent Document 1, a target value for the false acceptance probability is given first, and the lowest match rate that meets the target value is dynamically computed as the threshold. Thus, the threshold is different for each registered data item.

A pattern recognition apparatus disclosed in Patent Document 2 (Japanese Patent Application Laid-Open No. 2002-230551) involves, for a certain set of patterns, determining a difference between the feature vector of each pattern and the average feature vector of each correct category. This produces a set of difference vectors. An error distribution corresponding to this set of difference vectors is used as a probability density function to perform pattern recognition.

An object of the present invention is to provide a pattern recognition system, a pattern recognition method, and a pattern recognition program capable of increasing the accuracy in computing the false acceptance probability.

Another object of the present invention is to provide a pattern recognition system, a pattern recognition method, and a pattern recognition program capable of ensuring stable security strength.

Still another object of the present invention is to provide a pattern recognition system, a pattern recognition method, and a pattern recognition program capable of reducing the learning cost of pattern recognition.

DISCLOSURE OF THE INVENTION

The Disclosure of the Invention will be described below using reference numerals and symbols used in the Best Mode for Carrying Out the Invention. The reference numerals and symbols are added with brackets for clarifying the correspondence between the description in the Claims and the Best Mode for Carrying Out the Invention. However, the reference numerals and symbols should not be used for interpretation of the technical scope of the invention set forth in the Claims.

Pattern recognition systems (10, 10a) of the present invention comprise a first probability computation unit (32), and a second probability computation unit (33) coupled to the first probability computation unit (32). The first probability computation unit (32) computes a first probability ($P_{FCR}$) based on the number (n) of corresponding characteristic points (cs1 to csn, cf1 to cfn) indicating points corresponding between characteristic points (s1 to $sn_s$) in a first pattern and characteristic points (f1 to $fn_f$) in a second pattern. The first probability ($P_{FCR}$) indicates the probability of existence of a third pattern that has a larger number of corresponding characteristic points to the first pattern than the number (n) of the corresponding characteristic points. The second probability computation unit (33) refers to the first probability ($P_{FCR}$) to compute a false acceptance probability ($P_{FAR}$) indicating the probability of falsely determining that the first pattern and the second pattern correspond to each other.

A first vector (Di) and a second vector (Ds) are defined as follows: The first vector (Di) has components comprised of differences (d1 to dn) between the corresponding characteristic points (cs1 to csn) in the first pattern and the associated corresponding characteristic points (cf1 to cfn) in the second pattern. The second vector has components comprised of differences between pairs of corresponding characteristic points determined between the first pattern and a fourth pattern. In the pattern recognition systems (10, 10a) of the present invention, the second probability computation unit (33) computes a second probability ($P_{PRE}$) indicating the probability that the amount based on the second vector (Ds) is smaller than the amount based on the first vector (Di). Then, the second probability computation unit (33) computes the false acceptance probability ($P_{FAR}$) based on the first probability ($P_{FCR}$) and the second probability ($P_{PRE}$). For example, the second probability computation unit (33) computes the false acceptance probability ($P_{FAR}$) by multiplying the first probability ($P_{FCR}$) and the second probability ($P_{PRE}$) together.

In the pattern recognition systems (10, 10a) of the present invention, the second probability ($P_{PRE}$) may indicate the probability that the magnitude of the second vector (Ds) is smaller than the magnitude of the first vector (Di). The second probability ($P_{PRE}$) may indicate the probability that the product of the components of the second vector (Ds) is smaller than the product of the components (d1 to dn) of the first vector (Di). The second probability ($P_{PRE}$) may indicate the probability that each component of the second vector (Ds) is smaller than the corresponding component (d1 to dn) of the first vector (Di). The second probability ($P_{PRE}$) may indicate the probability of logical OR between the event that each component of the second vector (Ds) is smaller than the corresponding component (d1 to dn) of the first vector (Di) and the event that each component of the second vector (Ds) is smaller than the corresponding component of a third vector (Di'). The third vector (Di') has components resulting from rearranging the components (d1 to dn) of the first vector (Di).

In the pattern recognition systems (10, 10a) of the present invention, a distribution function (p(Ds)) of the second vector (Ds) is uniform.

The pattern recognition systems (10, 10a) of the present invention further comprise a difference data detection unit (31) coupled to the first probability computation unit (32). The difference data detection unit (31) receives first characteristic data (112) indicating the characteristic points (s1 to $sn_s$) in the first pattern and second characteristic data (122) indicating the characteristic points (f1 to $fn_f$) in the second pattern. The difference data detection unit (31) detects the corresponding characteristic points (cs1 to csn, cf1 to cfn) based on the first characteristic data (112) and the second characteristic data (122) and outputs difference data (131) indicating the detection result to the first probability computation unit (32). The difference data (131) includes the number (ns) of the characteristic points in the first pattern, the number (nf) of the characteristic points in the second pattern, the number (n) of the corresponding characteristic points, and the first vector (Di). The first probability computation unit (32) computes the first probability ($P_{FCR}$) based on the difference data (131). The second probability computation unit (33) is coupled to the difference data detection unit (31) via the first probability computation unit (32), so that the difference data (131) is provided to the second probability computation unit (33).

The pattern recognition system (10a) of the present invention further comprises an identification determination unit (34) coupled to the second probability computation unit (33). The identification determination unit (34) receives false acceptance probability data (133) indicating the false acceptance probability ($P_{FAR}$) from the second probability computation unit (33). The identification determination unit (34) compares the false acceptance probability ($P_{FAR}$) and a predetermined threshold ($P_{PFAR}$) and outputs a comparison result (134). For example, the identification determination unit (34) determines that the first pattern and the second pattern are identical if the false acceptance probability ($P_{FAR}$) is smaller than the predetermined threshold ($P_{PFAR}$). When it is determined that the first pattern and the second pattern are identical, a door is opened according to the comparison result (134), for example.

In the pattern recognition systems (10, 10a) of the present invention, the first pattern and the second pattern are fingerprint patterns, for example. Thus, the pattern recognition systems (10, 10a) of the present invention may be applied to a fingerprint authentication apparatus.

A pattern recognition method of the present invention comprises the steps of: (a) computing a first probability ($P_{FCR}$) based on the number (n) of corresponding characteristic points (cs1 to csn, cf1 to cfn) indicating points corresponding between characteristic points (s1 to $sn_s$) in a first pattern and characteristic points (f1 to $fn_f$) in a second pattern; and (b) referring to the first probability ($P_{FCR}$) to compute a false acceptance probability ($P_{FAR}$) indicating the probability of falsely determining that the first pattern and the second pattern correspond to each other.

In the pattern recognition method of the present invention, the computing step (b) comprises the steps of: (b-1) computing a second probability ($P_{PRE}$) indicating the probability that the amount based on a second vector (Ds) is smaller than the amount based on a first vector (Di); and (b-2) computing the false acceptance probability ($P_{FAR}$) based on the first probability ($P_{FCR}$) and the second probability ($P_{PRE}$). In the computing step (b-2), the false acceptance probability ($P_{FAR}$) is computed by multiplying the first probability ($P_{FCR}$) and the second probability ($P_{PRE}$) together, for example.

In the pattern recognition method of the present invention, the second probability ($P_{PRE}$) may indicate the probability that the magnitude of the second vector (Ds) is smaller than the magnitude of the first vector (Di). The second probability ($P_{PRE}$) may indicate the probability that the product of the components of the second vector (Ds) is smaller than the product of the components (d1 to dn) of the first vector (Di). The second probability ($P_{PRE}$) may indicate the probability that each component of the second vector (Ds) is smaller than the corresponding component (d1 to dn) of the first vector (Di). The second probability ($P_{PRE}$) may indicate the probability of logical OR between the event that each component of the second vector (Ds) is smaller than the corresponding component (d1 to dn) of the first vector (Di) and the event that each component of the second vector (Ds) is smaller than the corresponding component of a third vector (Di').

In the computing step (a) of the pattern recognition method of the present invention, the first probability ($P_{FCR}$) is computed based on the number (ns) of the characteristic points in the first pattern, the number (nf) of the characteristic points in the second pattern, and the number (n) of the corresponding characteristic points.

The pattern recognition method of the present invention further comprises the steps of: (c) comparing the false acceptance probability ($P_{FAR}$) and a predetermined threshold ($P_{PFAR}$); and (d) determining that the first pattern and the second pattern are identical if the false acceptance probability ($P_{FAR}$) is smaller than the predetermined threshold ($P_{PFAR}$).

A pattern recognition program of the present invention causes a computer to perform the steps of: (A) computing a first probability ($P_{FCR}$) based on the number (n) of corresponding characteristic points (cs1 to csn, cf1 to cfn) indicating points corresponding between characteristic points (s1 to $sn_s$) in a first pattern and characteristic points (f1 to $fn_f$) in a second pattern; and (B) referring to the first probability ($P_{FCR}$) to compute a false acceptance probability ($P_{FAR}$) indicating the probability of falsely determining that the first pattern and the second pattern correspond to each other.

In the computing step (B), the pattern recognition program causes the computer to perform the steps of: (B-1) computing a second probability ($P_{PRE}$) indicating the probability that the amount based on a second vector (Ds) is smaller than the amount based on a first vector (Di); and (B-2) computing the false acceptance probability ($P_{FAR}$) based on the first probability ($P_{FCR}$) and the second probability ($P_{PRE}$). In the computing step (B-2), the false acceptance probability ($P_{FAR}$) is computed by multiplying the first probability ($P_{FCR}$) and the second probability ($P_{PRE}$) together, for example.

In the pattern recognition program of the present invention, the second probability ($P_{PRE}$) may indicate the probability that the magnitude of the second vector (Ds) is smaller than the magnitude of the first vector (Di). The second probability ($P_{PRE}$) may indicate the probability that the product of the components of the second vector (Ds) is smaller than the product of the components (d1 to dn) of the first vector (Di). The second probability ($P_{PRE}$) may indicate the probability that each component of the second vector (Ds) is smaller than the corresponding component (d1 to dn) of the first vector (Di). The second probability ($P_{PRE}$) may indicate the probability of logical OR between the event that each component of the second vector (Ds) is smaller than the corresponding component (d1 to dn) of the first vector (Di) and the event that each component of the second vector (Ds) is smaller than the corresponding component of a third vector (Di').

In the computing step (A), the first probability ($P_{FCR}$) is computed based on the number (ns) of the characteristic points in the first pattern, the number (nf) of the characteristic points in the second pattern, and the number (n) of the corresponding characteristic points.

The pattern recognition program of the present invention further causes the computer to perform the steps of: (C) comparing the false acceptance probability ($P_{FAR}$) and ($P_{FAR}$) and a predetermined threshold ($P_{PFAR}$); and (D) determining that the first pattern and the second pattern are identical if the false acceptance probability ($P_{FAR}$) is smaller than the predetermined threshold ($P_{PFAR}$).

EFFECT OF THE INVENTION

The pattern recognition system, pattern recognition method, and pattern recognition program according to the present invention allow an increased accuracy in computing the false acceptance probability.

The pattern recognition system, pattern recognition method, and pattern recognition program according to the present invention allow ensuring of stable security strength.

The pattern recognition system, pattern recognition method, and pattern recognition program according to the present invention allow a reduced learning cost of pattern recognition.

BEST MODE FOR CARRYING OUT THE INVENTION

A pattern recognition system, pattern recognition method, and pattern recognition program according to the present invention will be described with reference to the appended drawings. In the present invention, the pattern recognition system compares a pattern to be recognized (hereafter referred to as an "input pattern") with a pattern stored in a database (hereafter referred to as a "reference pattern") and evaluates the match rate between the two patterns. Examples of these patterns include a person's fingerprint, face, and voiceprint.

First Embodiment

Figure 1:
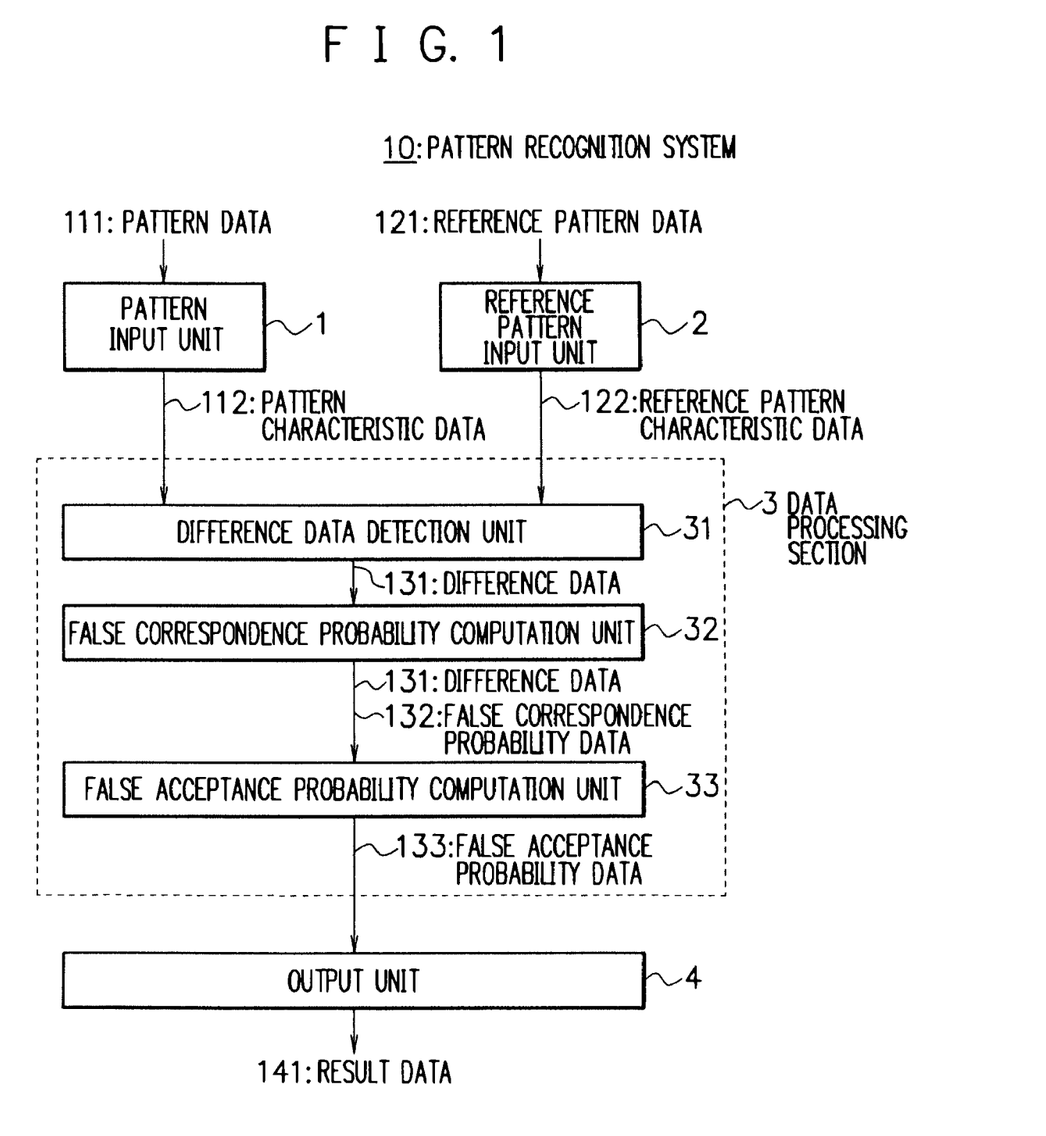
FIG. 1 is a block diagram showing a configuration of a pattern recognition system according to a first embodiment of the present invention.

FIG. 1 is a block diagram showing a configuration of the pattern recognition system according to a first embodiment of the present invention. In FIG. 1, the pattern recognition system 10 includes a pattern input unit 1, a reference pattern input unit 2, a data processing section 3, and an output unit 4. The data processing section 3 includes a difference data detection unit 31, a false correspondence probability computation unit 32, and a false acceptance probability computation unit 33. Now, the mechanism and operation of these units will be described one by one.

As shown in FIG. 1, the pattern input unit 1 receives pattern data 111 representing an input pattern to be recognized. Examples of the pattern data 111 include image data or voice data about a person. For example, the person may put his finger on a fingerprint sensor and input fingerprint image data (the pattern data 111) representing his fingerprint (the input pattern) to the pattern input unit 1. The pattern input unit 1 analyzes the pattern data 111 and extracts characteristic quantities of the input pattern. In the case of fingerprint recognition, examples of the characteristic quantities include characteristic points such as endpoints and branch points of fingerprint ridges. The pattern input unit 1 then outputs pattern characteristic data 112 representing information on the characteristic quantities (the characteristic points) to the difference data detection unit 31 in the data processing section 3.

Figure 5:
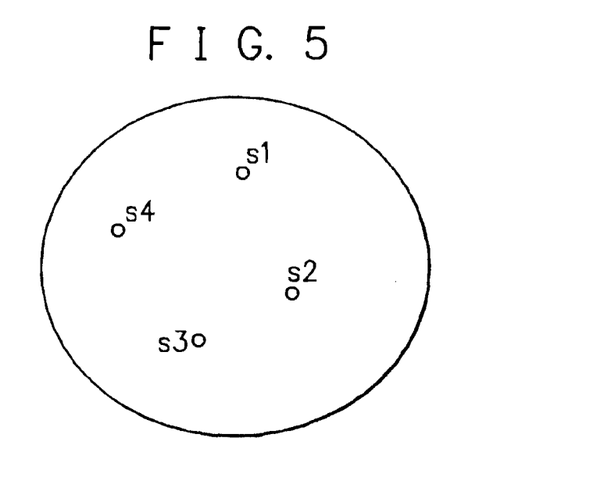
FIG. 5 is a conceptual view showing a distribution of characteristic points in an input pattern.

FIG. 5 is a conceptual view showing a distribution of the characteristic quantities of a certain input pattern. For example, the pattern data 111 such as fingerprint image data is analyzed, and as shown in FIG. 5, four characteristic points s1 to s4 are extracted from the image. The number of characteristic points in the input pattern is generally expressed as $n_s$ ($n_s$ is a natural number). That is, the input pattern has characteristic points s1 to $sn_s$. Instead of the pattern data 111, data representing this distribution of the characteristic quantities may be directly input to the pattern input unit 1.

As shown in FIG. 1, the reference pattern input unit 2 receives reference pattern data 121 representing a reference pattern. The reference pattern data 121 is registered in a database in advance. In authentication of a person, for example when the person inputs an ID number, the reference pattern data 121 corresponding to the ID number is provided from the database to the reference pattern input unit 2. Examples of the reference pattern data 121 include image data and voice data about a person. The reference pattern input unit 2 analyzes the reference pattern data 121 and extracts characteristic quantities of the pattern. In the case of fingerprint recognition, examples of the characteristic quantities include characteristic points such as endpoints and branch points of fingerprint ridges. The reference pattern input unit 2 then outputs reference pattern characteristic data 122 representing information on the characteristic quantities (the characteristic points) to the difference data detection unit 31 in the data processing section 3.

Figure 6:
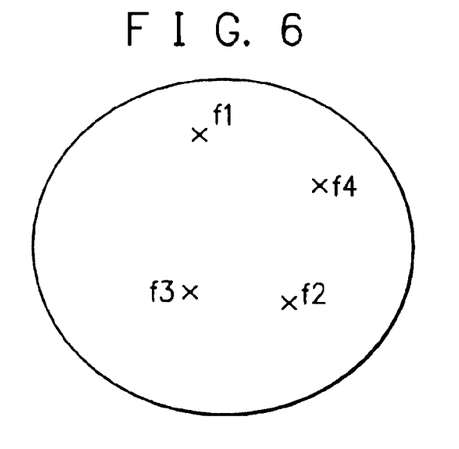
FIG. 6 is a conceptual view showing a distribution of characteristic points in a reference pattern.

FIG. 6 is a conceptual view showing a distribution of the characteristic quantities of a certain reference pattern. For example, the reference pattern data 121 such as fingerprint image data is analyzed, and as shown in FIG. 6, four characteristic points f1 to f4 are extracted from the image. The number of characteristic points in the reference pattern (hereafter referred to as reference characteristic points) is generally expressed as $n_f$ ($n_f$ is a natural number). That is, the reference pattern has reference characteristic points f1 to $fn_f$. Instead of the reference pattern data 121, data representing this distribution of the characteristic quantities may be directly input to the reference pattern input unit 2.

As shown in FIG. 1, the difference data detection unit 31 receives the pattern characteristic data 112 and the reference pattern characteristic data 122 from the pattern input unit 1 and the reference pattern input unit 2 respectively. The difference data detection unit 31 compares the pattern characteristic data 112 and the reference pattern characteristic data 122 to check the correspondence between the characteristic points s1 to sn$_s$ and the reference characteristic points f1 to fn$_f$.

Figure 7:
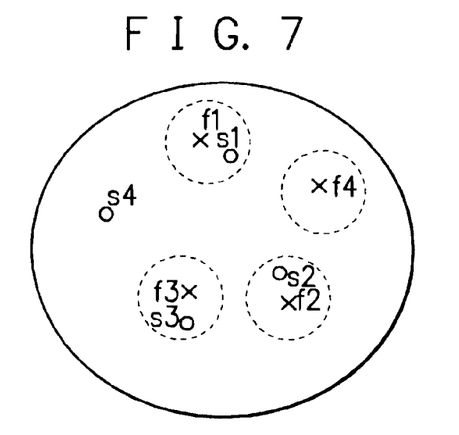
FIG. 7 is a conceptual view showing determination of correspondence between the characteristic points by a difference data detection unit.

FIG. 7 is a diagram superimposing FIGS. 5 and 6 to conceptually illustrate determination of the correspondence between the characteristic points by the difference data detection unit 31. In FIG. 7, circles depicted by dotted lines indicate predetermined ranges (reference ranges) containing the reference characteristic points f1 to f4 respectively. The difference data detection unit 31 refers to the reference ranges, and if a characteristic point is within a reference range, it determines that this characteristic point and the reference characteristic point in this reference range correspond to each other. In FIG. 7, it is determined that the characteristic point s1 and the reference characteristic point f1, the characteristic point s2 and the reference characteristic point f2, and the characteristic point s3 and the reference characteristic point f3 correspond to each other, respectively. These corresponding characteristic points and reference characteristic points are hereafter referred to as "corresponding characteristic points."

Figure 8:
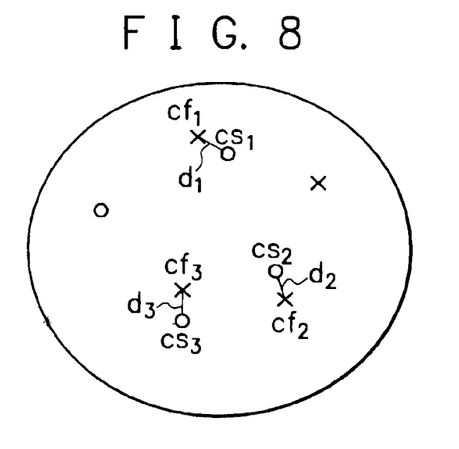
FIG. 8 is a conceptual view showing a distribution of corresponding characteristic points.

FIG. 8 is a conceptual view showing the corresponding characteristic points determined in FIG. 7. As shown in FIG. 8, the input pattern has three corresponding characteristic points cs1, cs2, and cs3. Similarly, the reference pattern has three corresponding characteristic points cf1, cf2, and cf3. The corresponding characteristic points cs1, cs2, and cs3 correspond to the corresponding characteristic points cf1, cf2, and cf3 respectively. Then, the difference data detection unit 31 computes the differences in physical quantity for the pairs of corresponding characteristic points. For example, the difference data detection unit 31 computes the distance d1 between the corresponding characteristic points cs1 and cf1, the distance d2 between the corresponding characteristic points cs2 and cf1, and the distance d3 between the corresponding characteristic points cs3 and cf3.

The number of pairs of corresponding characteristic points in the input pattern and the reference pattern is generally expressed as n (n is a natural number). That is, the input pattern has corresponding characteristic points cs1 to csn, and the reference pattern has corresponding characteristic points cf1 to cfn. The difference data detection unit 31 then computes the differences d1 to dn in physical quantity for the pairs of corresponding characteristic points and generates input difference data Di=(d1, d2, . . . , dn) indicating the differences. The input difference data Di is data representing an n-dimensional vector. For example, the difference data detection unit 31 computes the distances d1 to dn between the corresponding characteristic points cs1 to csn and the corresponding characteristic points cf1 to cfn respectively. In the case of fingerprint recognition, the difference data detection unit 31 may compute the differences of the directions of fingerprint ridges at each corresponding characteristic points. The difference data detection unit 31 outputs difference data 131 including the input difference data Di detected as above to the false correspondence probability computation unit 32 (see FIG. 1). Specifically, the difference data 131 includes the input difference data Di, the number of the corresponding characteristic points n, the number of the characteristic points in the input pattern ns, and the number of the reference characteristic points nf.

Then, as shown in FIG. 1, the false correspondence probability computation unit 32 receives the difference data 131 from the difference data detection unit 31 and computes a false correspondence probability P$_{FCR}$. The false correspondence probability P$_{FCR}$ is the probability of existence of another reference pattern that has a greater number of corresponding characteristic points to the input pattern than the above-described number of the corresponding characteristic points n. That is, the false correspondence probability P$_{FCR}$ indicates the probability of m>n, wherein the number of corresponding characteristic points between the input pattern being recognized and the reference pattern being recognized is n as described above, and the number of corresponding characteristic points between the input pattern being recognized and another reference pattern is m. Generally, the greater the number of corresponding characteristic points between two patterns under comparison is, the higher match rate the two patterns have.

The number of the characteristic points in the input pattern ns, the number of the reference characteristic points nf, and the number of the corresponding characteristic points n are provided by the difference data 131 from the difference data detection unit 31. The probability that characteristic points are falsely determined as corresponding to each other between different patterns is expressed as p. This p is determined in advance such as by a preliminary experiment. Then, the false correspondence probability P$_{FCR}$ between the input pattern and the reference pattern is given by the following formula 1.

$$P_{FCR} = \sum_{k=n}^{min(n_s, n_f)} \frac{n_s! n_f!}{k!(n_s-k)!(n_f-k)!} \frac{\left(\Gamma\frac{1}{p} - n_s + 1\right)\Gamma\left(\frac{1}{p} - n_f + 1\right)}{\Gamma\left(\frac{1}{p} + 1\right)\Gamma\left(\frac{1}{p} - n_s - n_f + k + 1\right)} \quad (1)$$

Then, the false correspondence probability computation unit 32 outputs false correspondence probability data 132 indicating the computed false correspondence probability P$_{FCR}$, as well as the difference data 131, to the false acceptance probability computation unit 33.

As shown in FIG. 1, the false acceptance probability computation unit 33 receives the difference data 131 and the false correspondence probability data 132 from the false correspondence probability computation unit 32. The false acceptance probability computation unit 33 then computes a preliminary false acceptance probability P$_{PRE}$ defined as described below.

The input difference data Di=(d1, d2, . . . , dn) computed from the distribution of the corresponding characteristic points between the input pattern being recognized and the reference pattern being recognized is an n-dimensional vector. Here, the difference data obtained based on the distribution of n corresponding characteristic points between the input pattern being recognized and another reference pattern is referred to as a candidate difference data Ds. This candidate difference data Ds is also data representing an n-dimensional vector. Then, the preliminary false acceptance probability P$_{PRE}$ is the probability that a "quantity" based on the candidate difference data Ds is smaller than a "quantity" based on the input difference data Di. An example of the quantity is the "magnitude (norm)." In that case, the preliminary false acceptance probability P$_{PRE}$ means the probability that the norm of the candidate difference data Ds is smaller than the norm of the input difference data Di. The "quantity" depends on models described below.

Now, the technique of computing a false acceptance probability P$_{FAR}$ by the false acceptance probability computation unit 33 will be described in more detail. A probability density function (distribution function) of the above-described candidate difference data Ds is expressed as p(Ds). The p(Ds) is determined in advance by a preliminary experiment or assumed to conform to a uniform distribution model. A set of candidate difference data Ds whose "quantity" is smaller than the "quantity" based on the input difference data Di is expressed as R(Di). Then, the preliminary false acceptance probability $P_{PRE}$ between the input pattern and the reference pattern is given by the following formula 2.

$$P_{PRE} = \int_{D_S \in R(D_i)} p(D_S) \quad (2)$$

Figure 9:
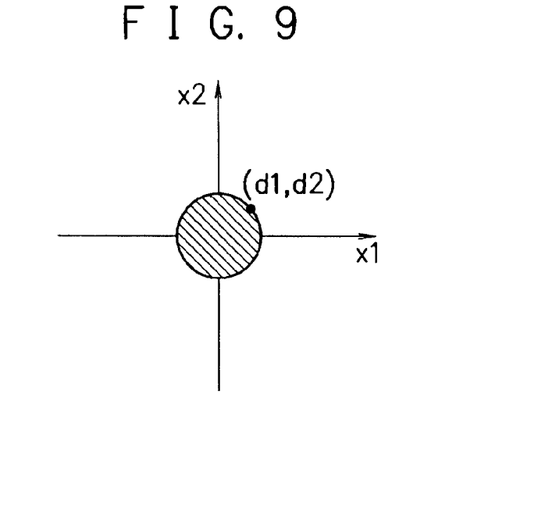
FIG. 9 is a graph showing an exemplary distribution of candidate difference data.

For example, FIG. 9 is a graph that conceptually shows a model of the above-mentioned set R(Di). It is assumed here that the input difference data Di is a two-dimensional vector, i.e., Di=(d1, d2). In FIG. 9, the "magnitude (norm)" of the difference data is adopted as the above-mentioned "quantity." That is, the set R(Di) includes candidate difference data Ds whose norm is smaller than the norm of the input difference data Di. Thus, the set R(Di) is defined by the shaded circular area in the figure. The probability density function p(Ds) of the candidate difference data Ds is determined by a preliminary experiment. Alternatively, it is assumed that the probability density function p(Ds) is uniform. In this case, the preliminary false acceptance probability $P_{PRE}$ is equal to the size of the circular area.

Figure 10:
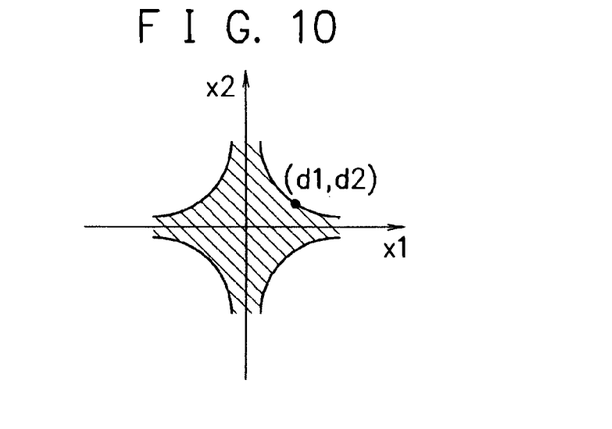
FIG. 10 is a graph showing another exemplary distribution of candidate difference data.

FIG. 10 is a graph that conceptually shows another model of the above-mentioned set R(Di). In FIG. 10, the "product of components" of the difference data is adopted as the above-mentioned "quantity." That is, the product of components of candidate difference data Ds included in the set R(Di) is smaller than the product d1d2 of the components of the input difference data Di. Thus, the set R(Di) is defined by the shaded area in the figure. It is assumed here that the probability density function p(Ds) is uniform and all components of the candidate difference data Ds are within the range of [0,1]. When the preliminary false acceptance probability $P_{PRE}$ in this case is expressed as $P_1$, the preliminary false acceptance probability $P_1$ is given by the following formula 3 or 4:

$$P_1(d_1, \ldots, d_n) = \int\int_{x_1 x_2 \ldots x_n \le d_1 d_2 \ldots d_n} dx_1 dx_2 \ldots dx_n; \quad (3)$$

$$P_1(d_1, \ldots, d_n) = \sum_{k=1}^{n} (-1)^{k-1} \frac{1}{(k-1)!} t(\log t)^{k-1}, \quad (4)$$

wherein t in the formula 4 is given by t=d1 d2 . . . dn.

Figure 11:
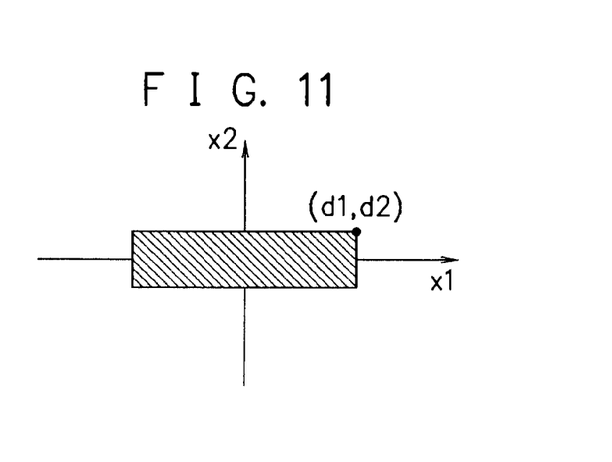
FIG. 11 is a graph showing still another exemplary distribution of candidate difference data.

FIG. 11 is a graph that conceptually shows still another model of the above-mentioned set R(Di). In FIG. 11, the "components" of the difference data is adopted as the above-mentioned "quantity." That is, each component of candidate difference data Ds included in the set R(Di) is smaller than the corresponding one of the components d1 and d2 of the input difference data Di. Thus, the set R(Di) is defined by the shaded rectangular area in the figure. The probability density function p(Ds) of the candidate difference data is determined by a preliminary experiment. Alternatively, it is assumed that the probability density function p(Ds) is uniform. In this case, the preliminary false acceptance probability $P_{PRE}$ is equal to the size of the rectangular area.

Figure 12:
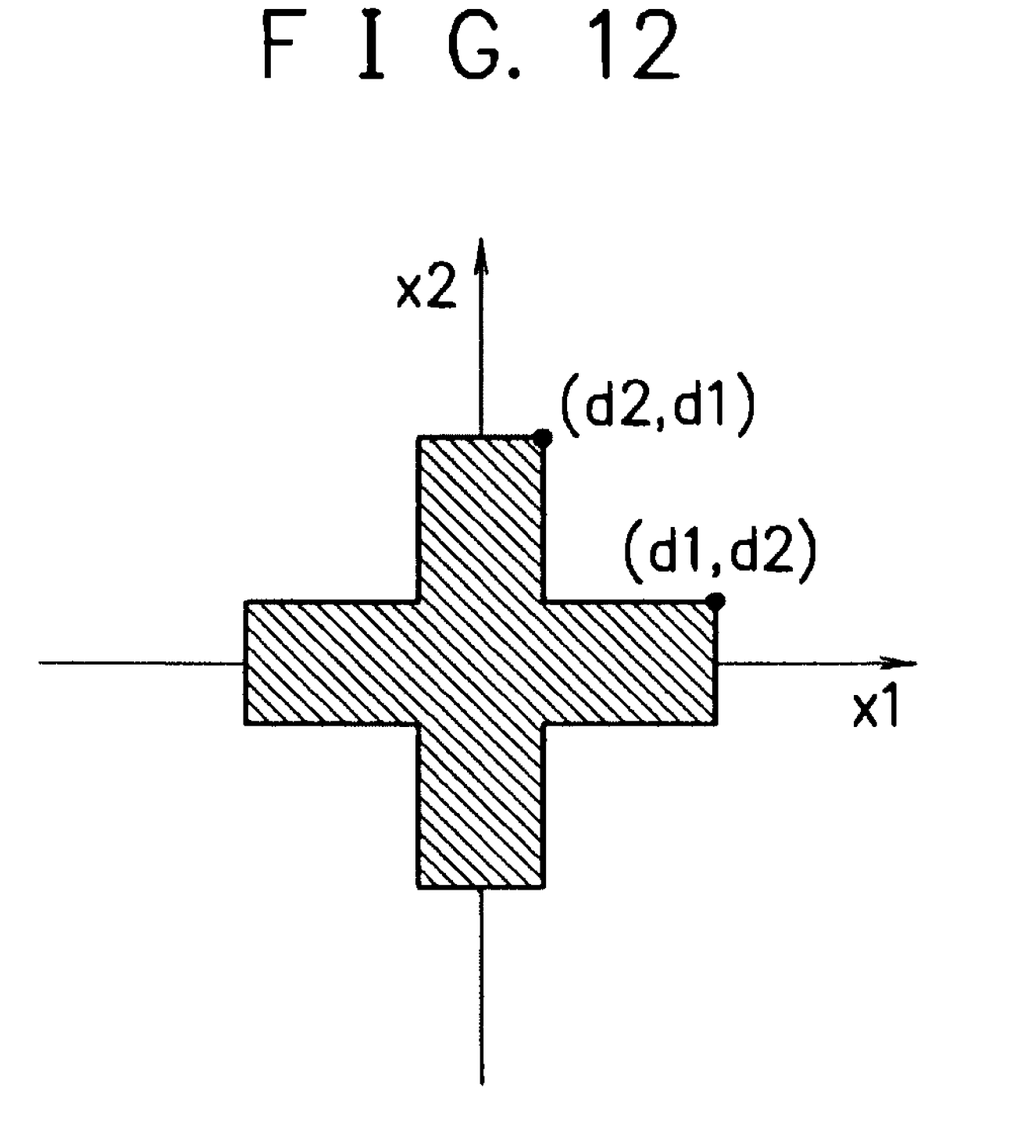
FIG. 12 is a graph showing still another exemplary distribution of candidate difference data.

FIG. 12 is a graph that conceptually shows a still another model of the above-described set R(Di). In FIG. 12, the set R(Di) includes the set R(Di) shown in FIG. 11. The set R(Di) further includes the set R(Di') determined in the same manner as in FIG. 11, wherein Di'=(d2, d1), i.e., data resulting from rearranging the components of the input difference data Di.

That is, each component of candidate difference data Ds included in the set R(Di) is smaller than the corresponding component of the input difference data Di or the above-described data Di'. Thus, the set R(Di) is defined by the shaded area in the figure. This set R(Di) is effective when all characteristic points have similar nature, such as in the case of fingerprint patterns. It is assumed here that the probability density function p(Ds) is uniform and all components of the candidate difference data Ds are within the range of [0,1]. It is further assumed that, when the components d1 to dn of the input difference data Di are sorted in order of magnitude, they have the relation |dn'|≦ . . . ≦|d2'|≦|d1'| (n' is a natural number). When the preliminary false acceptance probability $P_{PRE}$ in this case is expressed as $P_2$, the preliminary false acceptance probability $P_2$ is given by the following formula 5.

$$P_2(d_1, \ldots, d_n) = n! \int_0^{d_n} dx_n \ldots \int_{x_2}^{d_1} dx_1 \quad (5)$$

The preliminary false acceptance probability $P_2$ is also given by the following recursion formulas 6 to 8.

$$P_2(d_1, d_2 \ldots, d_n) = n! C_n \quad (6)$$

$$C_n = \sum_{k=1}^{n} (-1)^{k-1} \frac{1}{k!} C_{n-k} d_n^{\prime k} \quad (7)$$

$$C_0 = 1 \quad (8)$$

Once the preliminary false acceptance probability $P_{PRE}$ is computed in this manner, the false acceptance probability computation unit 33 integrates this preliminary false acceptance probability $P_{PRE}$ and the false correspondence probability $P_{FCR}$ from the false correspondence probability computation unit 32 to finally compute the false acceptance probability $P_{FAR}$. For example, the false acceptance probability computation unit 33 computes the false acceptance probability $P_{FAR}$ by multiplying the preliminary false acceptance probability $P_{PRE}$ and the false correspondence probability $P_{FCR}$ together. The false acceptance probability computation unit 33 then outputs false acceptance probability data 133 indicating the computed false acceptance probability $P_{FAR}$ to the output unit 4.

As shown in FIG. 1, the output unit 4 receives the false acceptance probability data 133 from the false acceptance probability computation unit 33 and outputs result data 141 indicating the false acceptance probability $P_{FAR}$. The result data 141 also means the security strength of the pattern recognition system 10 and the evaluation value for the pattern besides the false acceptance probability of the pattern recognition result.

The false acceptance probability computation unit 33 may be connected to both the difference data detection unit 31 and the false correspondence probability computation unit 32. In that case, the difference data detection unit 31 provides the difference data 131 to both the false correspondence probability computation unit 32 and the false acceptance probability computation unit 33. The false correspondence probability computation unit 32 provides only the false correspondence probability data 132 to the false acceptance probability computation unit 33.

The above-described processing in the data processing section 3 may be performed by a computer. That is, the processing in the difference data detection unit 31, the false correspondence probability computation unit 32, and the false acceptance probability computation unit 33 is each written as a computer program and executed by a computer.

Figure 2:
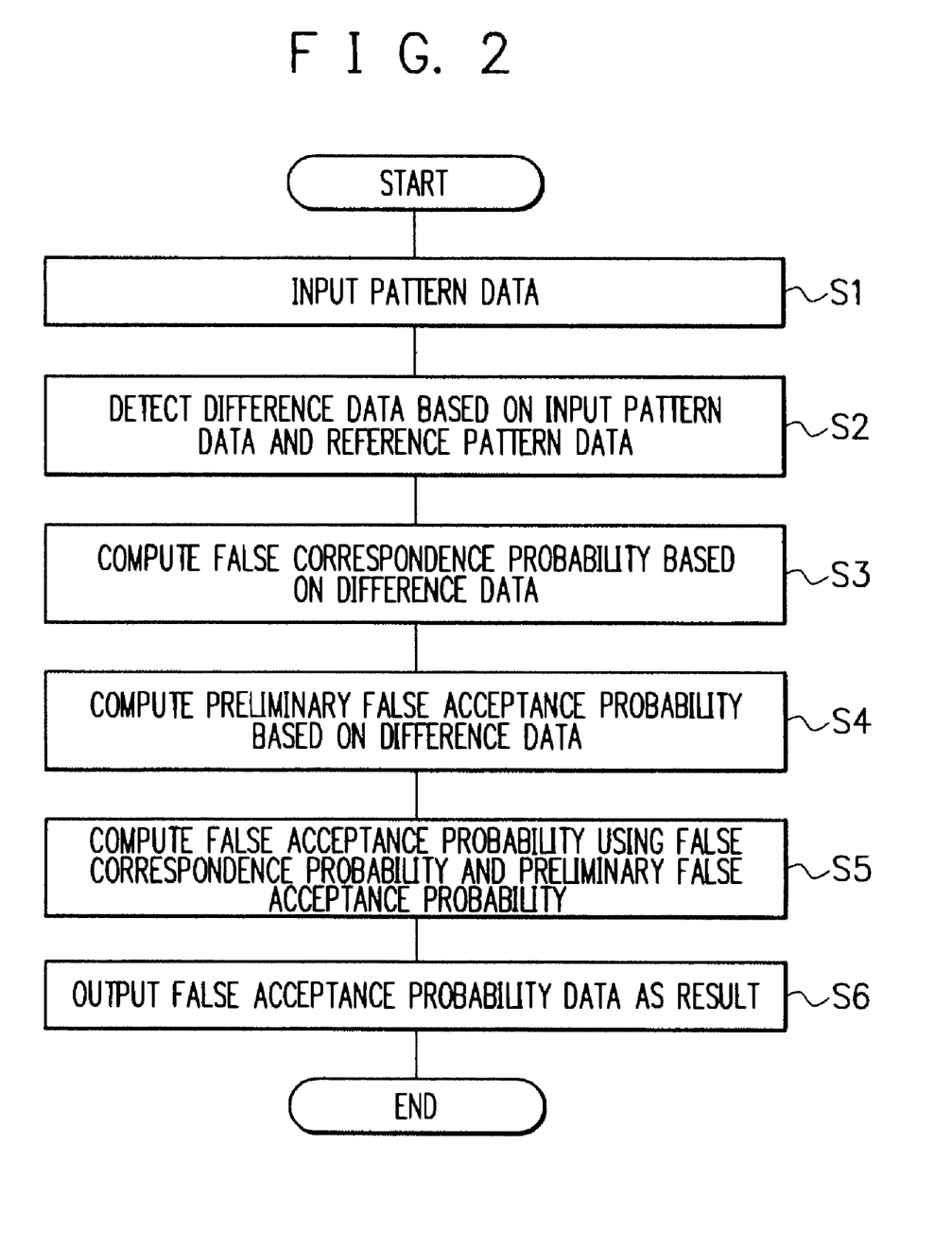
FIG. 2 is a flowchart showing a pattern recognition method according to the first embodiment of the present invention.

FIG. 2 is a flowchart showing the summary of the pattern recognition method according to the first embodiment of the present invention. First, the pattern data 111 is input to the pattern input unit 1 (step S1). Then, the difference data detection unit 31 detects the difference data 131 based on the pairs of characteristic quantities of the pattern data 111 and the reference pattern data 112 (step S2). The difference data 131 includes the number of characteristic points (ns) in the input pattern, the number of characteristic points (nf) in the reference pattern, the number of corresponding characteristic points (n), and the input difference data Di=(d1, ..., dn). Then, the false correspondence probability computation unit 32 receives the difference data 131 and computes the false correspondence probability $P_{FCR}$ based on the difference data 131 (step S3). Then, the false acceptance probability computation unit 33 receives the difference data 131 and computes the preliminary false acceptance probability $P_{PRE}$ based on the difference data 131 (step S4). The false acceptance probability computation unit 33 also computes the false acceptance probability $P_{FAR}$ using the computed false correspondence probability $P_{FCR}$ and the computed preliminary false acceptance probability $P_{PRE}$ (step S5). Then, data indicating the false acceptance probability $P_{FAR}$ is output from the output unit 4 (step S6).

Advantages of the pattern recognition method, system and program according to this embodiment are as follows. The pattern recognition system 10 according to the present invention includes the false correspondence probability computation unit 32 and the false acceptance probability computation unit 33, and computes the false acceptance probability $P_{FAR}$ based on the false correspondence probability $P_{FCR}$ and the preliminary false acceptance probability $P_{PRE}$. This increases the accuracy in computing the false acceptance probability $P_{FAR}$ for the input pattern and the reference pattern. The false correspondence probability $P_{FCR}$ is the probability of existence of a larger number of corresponding characteristic points than the number of corresponding characteristic points n. The preliminary false acceptance probability $P_{PRE}$ is the probability that the "quantity" based on the candidate difference data Ds is smaller than the "quantity" based on the input difference data Di. Examples of the "quantity" include the norm of the difference data.

The pattern recognition system 10 according to the present invention computes the false acceptance probability $P_{FAR}$ based not only on the preliminary false acceptance probability $P_{PRE}$ but also on the false correspondence probability $P_{FCR}$. That is, the number of corresponding characteristic points n is taken into consideration in computing the false acceptance probability $P_{FAR}$. As apparent from the formulas 1 and 5, the greater the number of corresponding characteristic points n is, the smaller the computed false acceptance probability $P_{FAR}$ is. This increases the reliability of the system.

Furthermore, in the cases such as identifying a fingerprint or recognizing an object outdoors, the characteristic quantities of the patterns have almost similar nature. In such cases, the model shown in FIG. 12 is effective. That is, the data Di' resulting from rearranging the components of the input difference data Di is also used to compute the preliminary false acceptance probability $P_{PRE}$. Specifically, the preliminary false acceptance probability $P_{PRE}$ is computed as the probability that each component of the candidate difference data Ds is smaller than the corresponding component of the input difference data Di or the above-described data Di'. This further increases the accuracy in computing the false acceptance probability $P_{FAR}$.

In addition, the probability density function p(Ds) of the candidate difference data Ds is modeled with a uniform distribution function. This reduces the learning cost for the pattern recognition system 10.

Second Embodiment

Figure 3:
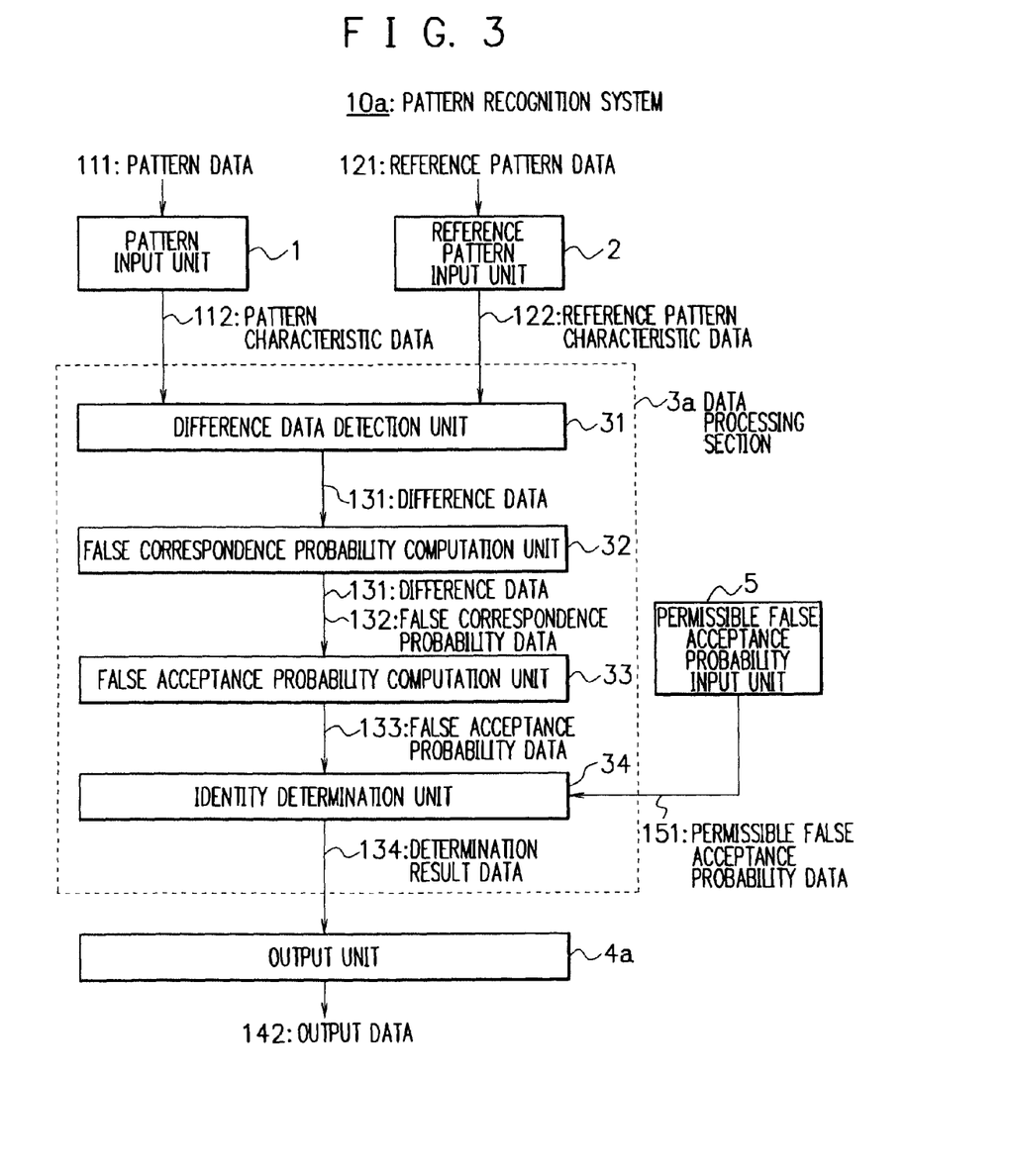
FIG. 3 is a block diagram showing a configuration of a pattern recognition system according to a second embodiment of the present invention.

FIG. 3 is a block diagram showing a configuration of the pattern recognition system according to a second embodiment of the present invention. In FIG. 3, components similar to those shown in FIG. 1 are given the same reference numerals, and the description thereof will be omitted as appropriate.

In FIG. 3, the pattern recognition system 10a includes a pattern input unit 1, a reference pattern input unit 2, a data processing section 3a, an output unit 4a, and a permissible false acceptance probability input unit 5. The data processing section 3a includes a difference data detection unit 31, a false correspondence probability computation unit 32, a false acceptance probability computation unit 33, and an identity determination unit 34.

In this embodiment, the false acceptance probability computation unit 33 outputs the false acceptance probability data 133 indicating the computed false acceptance probability $P_{FAR}$ to the identity determination unit 34. The permissible false acceptance probability input unit 5 outputs permissible false acceptance probability data 151 indicating a permissible false acceptance probability $P_{PFAR}$ to the identity determination unit 34. The permissible false acceptance probability $P_{PFAR}$ is the false acceptance probability permitted by the system, i.e., the threshold for pattern recognition.

The identity determination unit 34 receives the false acceptance probability data 133 and the permissible false acceptance probability data 151 from the false acceptance probability computation unit 33 and the permissible false acceptance probability input unit 5 respectively. The identity determination unit 34 then determines whether the false acceptance probability $P_{FAR}$ is smaller than the permissible false acceptance probability $P_{PFAR}$. If the false acceptance probability $P_{FAR}$ is smaller than the permissible false acceptance probability $P_{PFAR}$, the identity determination unit 34 determines that the input pattern and the reference pattern are identical. If the false acceptance probability $P_{FAR}$ is larger than the permissible false acceptance probability $P_{PFAR}$, the identity determination unit 34 does not determine that the input pattern and the reference pattern are identical. The identity determination unit 34 outputs determination result data 134 indicating this determination result to the output unit 4a.

The output unit 4a receives the determination result data 134 from the identity determination unit 34 and outputs output data 142 based on the determination result. For example, when the pattern recognition system 10a is applied to a door control, a door is controlled to open according to the output data 142. When the pattern recognition system 10a is applied to an ATM of a bank, an operation by a customer is accepted or rejected according to the output data 142. Examples of the pattern data 111 that is input to the pattern input unit include image data about the customer's fingerprint, face, and iris.

For example, when a four-digit personal identification number (PIN) is used for authentication of a person as a common practice, the probability of false authentication in the system (hereafter referred to as the security strength) is one ten-thousandth. To achieve the same security strength in the pattern recognition system 10a according to the present invention, the permissible false acceptance probability $P_{PFAR}$ may be set to one ten-thousandth. Thus, the permissible false acceptance probability $P_{PFAR}$ (the threshold) directly means the security strength of the system. The permissible false acceptance probability $P_{PFAR}$ may be set in advance to a constant value in the data processing section 3a.

The above-described processing in the data processing section 3a may be performed by a computer. That is, the processing in the difference data detection unit 31, the false correspondence probability computation unit 32, the false acceptance probability computation unit 33, and the identity determination unit 34 is each written as a computer program and executed by a computer.

Figure 4:
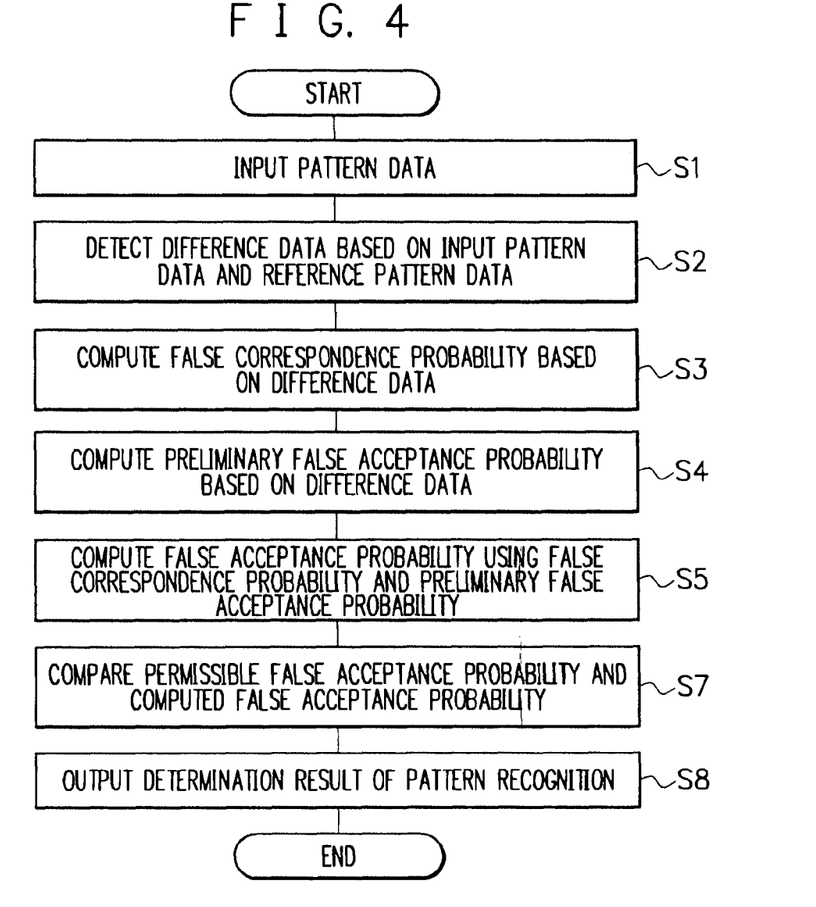
FIG. 4 is a flowchart showing a pattern recognition method according to the second embodiment of the present invention.

FIG. 4 is a flowchart showing the summary of the pattern recognition method according to the second embodiment of the present invention. First, the pattern data 111 is input to the pattern input unit 1 (step S1). Then, the difference data detection unit 31 detects the difference data 131 based on the pairs of characteristic quantities of the pattern data 111 and the reference pattern data 112 (step S2). Then, the false correspondence probability computation unit 32 receives the difference data 131 and computes the false correspondence probability $P_{FCR}$ based on the difference data 131 (step S3). Then, the false acceptance probability computation unit 33 receives the difference data 131 and computes the preliminary false acceptance probability $P_{PRE}$ based on the difference data 131 (step S4). The false acceptance probability computation unit 33 also computes the false acceptance probability $P_{FAR}$ using the computed false correspondence probability $P_{FCR}$ and the computed preliminary false acceptance probability $P_{PRE}$ (step S5). Then, the identity determination unit 34 compares the permissible false acceptance probability $P_{PFAR}$ and the computed false acceptance probability $P_{FAR}$ to determine whether the false acceptance probability $P_{FAR}$ is smaller than the permissible false acceptance probability $P_{PFAR}$ (step S7). The output data 142 indicating the determination result is output from the output unit 4 (step S8).

In addition to the advantages of the first embodiment, the pattern recognition system 10a according to the present embodiment provides the following advantages. In the pattern recognition system 10a, the threshold applied to all input patterns is set to be constant. Furthermore, the applied threshold directly means the permissible false acceptance probability $P_{PFAR}$, i.e., the security strength of the system. This ensures stable security strength. This direct correspondence of the threshold to the security strength is desirable from the viewpoint of system operation.

The above-described pattern recognition systems 10 and 10a are applicable to speech recognition, fingerprint identification, optical character recognition, signal recognition, and so forth.

Regardless of the above-described embodiments, various modifications may be made to the pattern recognition system, pattern recognition method, and pattern recognition program according to the present invention without departing from the spirit thereof. As an example, since the input pattern and the reference pattern are treated as a pair, the pattern data 111 may be input to the reference pattern input unit 2 and the reference pattern data 121 may be input to the pattern input unit 1.

What is claimed is:

1. A pattern recognition system comprising:
    means for computing a first probability indicating the probability of existence of a third pattern having a greater number of corresponding characteristic points to a first pattern than said number of the corresponding characteristic points, based on the number of corresponding characteristic points indicating points corresponding between characteristic points in the first pattern and characteristic points in a second pattern; and
    means for computing, based on the first probability, a false acceptance probability indicating the probability of falsely determining that the first pattern and the second pattern correspond to each other.

2. The pattern recognition system according to claim 1, comprising:
    means for determining a first vector including differences between the corresponding characteristic points in the first pattern and the associated corresponding characteristic points in the second pattern; and
    means for computing, based on the first vector, a second probability indicating the probability of existence of a second vector having difference components between pairs of corresponding characteristic points determined between the first pattern and any pattern and computing the false acceptance probability based on the first probability and the second probability.

3. The pattern recognition system according to claim 2, wherein
    the false acceptance probability is computed by multiplying the first probability and the second probability together.

4. The pattern recognition system according to claim 2, wherein
    the second probability indicates the probability that the magnitude of the second vector is smaller than the magnitude of the first vector.

5. The pattern recognition system according to claim 2, wherein
    the second probability indicates the probability that the product of the components of the second vector is smaller than the product of the components of the first vector.

6. The pattern recognition system according to claim 2, wherein
the second probability indicates that each component of the second vector is smaller than the corresponding component of the first vector.

7. The pattern recognition system according to claim 2, wherein
a third vector has components resulting from rearranging the components of the first vector, and
the second probability indicates the probability of logical OR between the event that each component of the second vector is smaller than the corresponding component of the first vector and the event that each component of the second vector is smaller than the corresponding component of the third vector.

8. The pattern recognition system according to claim 2, wherein
a distribution function of the second vector is uniform.

9. The pattern recognition system according to claim 2, further comprising a difference data detection unit, wherein
the difference data detection unit receives first characteristic data indicating the characteristic points in the first pattern and second characteristic data indicating the characteristic points in the second pattern, detects the corresponding characteristic points based on the first characteristic data and the second characteristic data, and computes difference data indicating the detection result.

10. The pattern recognition system according to claim 2, further comprising an identification determination unit, wherein
the identification determination unit compares the false acceptance probability and a predetermined threshold, and outputs a comparison result.

11. The pattern recognition system according to claim 2, wherein
the first pattern and the second pattern are fingerprint patterns.

12. The pattern recognition system according to claim 1, further comprising a difference data detection unit, wherein
the difference data detection unit receives first characteristic data indicating the characteristic points in the first pattern and second characteristic data indicating the characteristic points in the second pattern, detects the corresponding characteristic points based on the first characteristic data and the second characteristic data, and computes difference data indicating the detection result.

13. The pattern recognition system according to claim 12, wherein the difference data includes:
the number of the characteristic points in the first pattern;
the number of the characteristic points in the second pattern;
the number of the corresponding characteristic points; and
the first vector, and
wherein the false acceptance probability is computed based on the difference data.

14. The pattern recognition system according to claim 1, further comprising an identification determination unit, wherein
the identification determination unit compares the false acceptance probability and a predetermined threshold, and outputs a comparison result.

15. The pattern recognition system according to claim 14, wherein
the identification determination unit determines that the first pattern and the second pattern are identical if the false acceptance probability is smaller than the predetermined threshold.

16. The pattern recognition system according to claim 1, wherein
the first pattern and the second pattern are fingerprint patterns.

17. A pattern recognition method comprising the steps of:
based on the number of corresponding characteristic points indicating points corresponding between characteristic points in a first pattern and characteristic points in a second pattern, computing, via a computer, a first probability indicating the probability of existence of a third pattern having a greater number of corresponding characteristic points to the first pattern than said number of the corresponding characteristic points; and
referring to the first probability to compute, via the computer, a false acceptance probability indicating the probability of falsely determining that the first pattern and the second pattern correspond to each other.

18. The pattern recognition method according to claim 17, comprising the steps of:
determining a first vector including differences between the corresponding characteristic points indicating points in the first pattern and the associated corresponding characteristic points in the second pattern; and
using the first vector to compute a second probability indicating the probability of existence of a second vector having difference components between pairs of corresponding characteristic points determined between the first pattern and any pattern and computing the false acceptance probability based on the first probability and the second probability.

19. The pattern recognition method according to claim 18, wherein
the false acceptance probability is computed by multiplying the first probability and the second probability together.

20. The pattern recognition method according to claim 18, wherein
the second probability indicates the probability that the magnitude of the second vector is smaller than the magnitude of the first vector.

21. The pattern recognition method according to claim 18, wherein
the second probability indicates the probability that the product of the components of the second vector is smaller than the product of the components of the first vector.

22. The pattern recognition method according to claim 18, wherein
the second probability indicates the probability that each component of the second vector is smaller than the corresponding component of the first vector.

23. The pattern recognition method according to claim 18, wherein
the third vector has components resulting from rearranging the components of the first vector, and
the second probability indicates the probability of logical OR between the event that each component of the second vector is smaller than the corresponding component of the first vector and the event that each component of the second vector is smaller than the corresponding component of the third vector.

24. The pattern recognition method according to claim 18, further comprising the steps of:
- comparing the false acceptance probability and a predetermined threshold; and
- determining that the first pattern and the second pattern are identical if the false acceptance probability is smaller than the predetermined threshold.

25. The pattern recognition method according to claim 17, further comprising the steps of:
- comparing the false acceptance probability and a predetermined threshold; and
- determining that the first pattern and the second pattern are identical if the false acceptance probability is smaller than the predetermined threshold.

26. A non-transitory computer readable medium storing a pattern recognition program for causing a computer to perform the steps of:
- based on the number of corresponding characteristic points indicating points corresponding between characteristic points in a first pattern and characteristic points in a second pattern, computing a first probability indicating the probability of existence of a third pattern having a greater number of corresponding characteristic points to the first pattern than said number of the corresponding characteristic points; and
- referring to the first probability to compute a false acceptance probability indicating the probability of falsely determining that the first pattern and the second pattern correspond to each other.

27. The non-transitory computer readable medium according to claim 26, comprising the steps of:
- determining a first vector including differences between the corresponding characteristic points in the first pattern and the associated corresponding characteristic points in the second pattern; and
- using the first vector to compute a second probability indicating the probability of existence of a second vector having difference components between pairs of corresponding characteristic points determined between the first pattern and any pattern, and computing the false acceptance probability based on the first probability and the second probability.

28. The non-transitory computer readable medium according to claim 27, wherein
the false acceptance probability is computer by multiplying the first probability and the second probability together.

29. The non-transitory computer readable medium according to claim 14, wherein
the second probability indicates the probability that the magnitude of the second vector is smaller than the magnitude of the first vector.

30. The non-transitory computer readable medium according to claim 27, wherein
the second probability indicates the probability that the product of the components of the second vector is smaller than the product of the components of the first vector.

31. The non-transitory computer readable medium according to claim 27, wherein
the second probability indicates the probability that each component of the second vector is smaller than the corresponding component of the first vector.

32. The non-transitory computer readable medium according to claim 27, wherein
a third vector has components resulting from rearranging the components of the first vector, and
the second probability indicates the probability of logical OR between the event that each component of the second vector is smaller than the corresponding component of the first vector and the event that each component of the second vector is smaller than the corresponding component of the third vector.

33. The non-transitory computer readable medium according to claim 27, further causing the computer to perform the following:
- receiving first characteristic data indicating the characteristic points in the first pattern and second characteristic data indicating the characteristic point in the second pattern, detecting the corresponding characteristic points based on the first characteristic data and the second characteristic data, and computing difference data indicating the detection result,
- the difference data including the number of the characteristic points in the first pattern, the number of the characteristic points in the second pattern, the number of the corresponding characteristic points, and the first vector; and
- computing the false acceptance probability based on the difference data.

34. The non-transitory computer readable medium according to claim 26, further causing a computer to perform the following:
- comparing the false acceptance probability and a predetermined threshold; and
- determining that the first pattern and the second pattern are identical if the false acceptance probability is smaller than the predetermined threshold.

* * * * *